Sept. 5, 1944.    W. F. THORNE    2,357,705
PORTABLE GRAIN STORAGE TANK
Filed Feb. 17, 1941    6 Sheets-Sheet 1
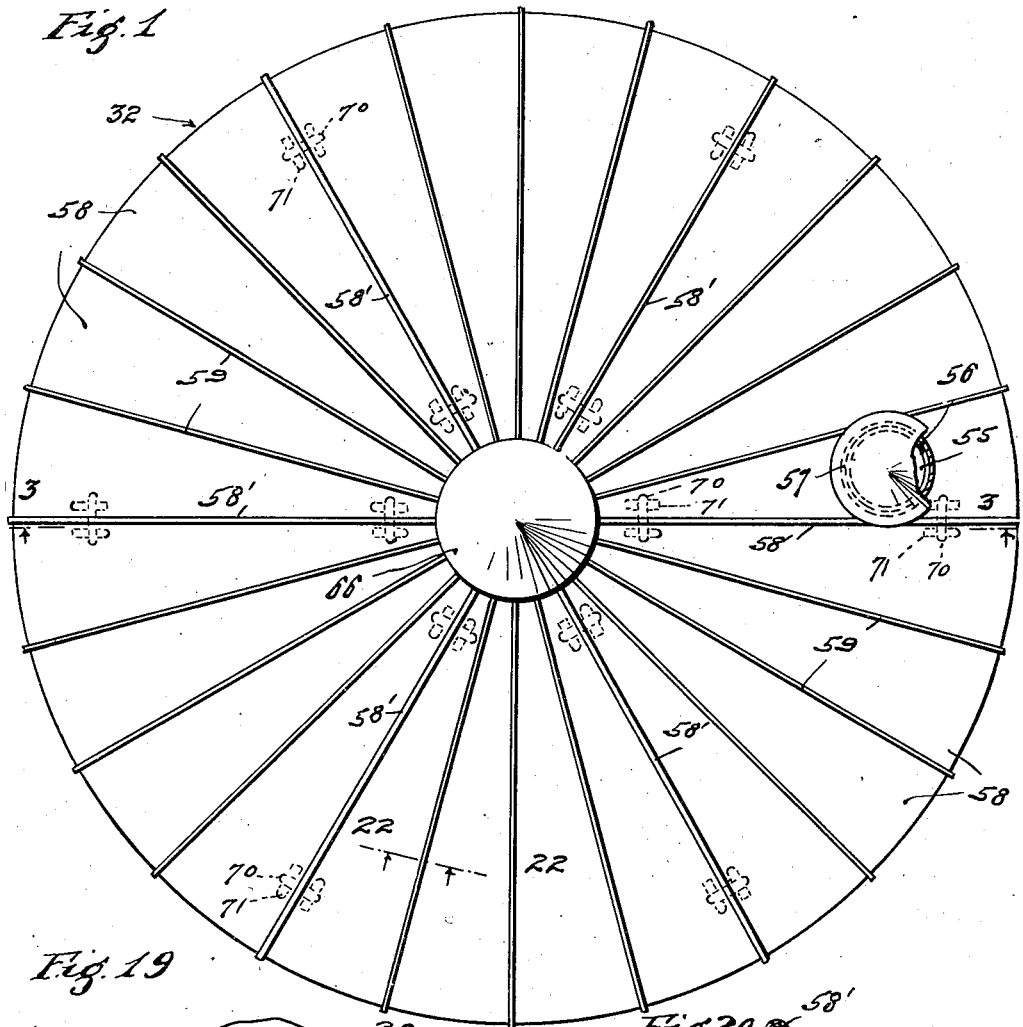
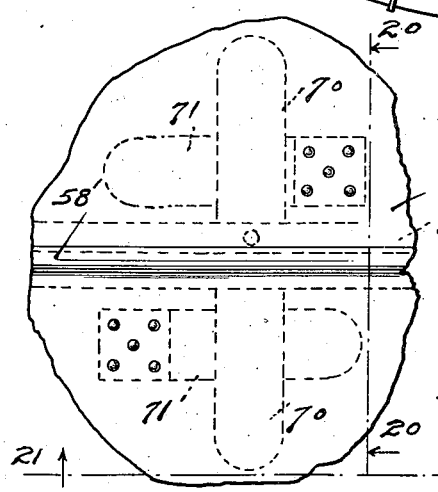
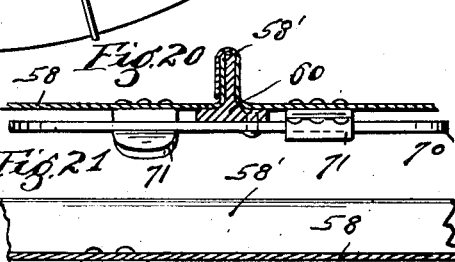
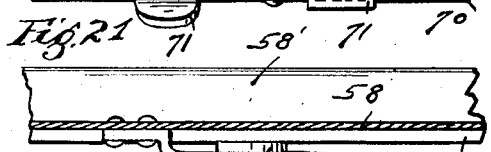
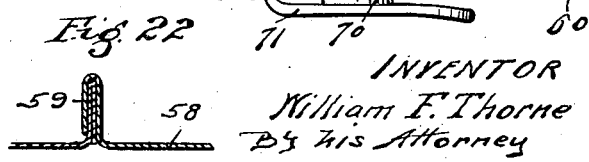
INVENTOR
William F. Thorne
By his Attorney
Harry S. Kilgore Sept. 5, 1944. W. F. THORNE 2,357,705
PORTABLE GRAIN STORAGE TANK
Filed Feb. 17, 1941 6 Sheets-Sheet 2
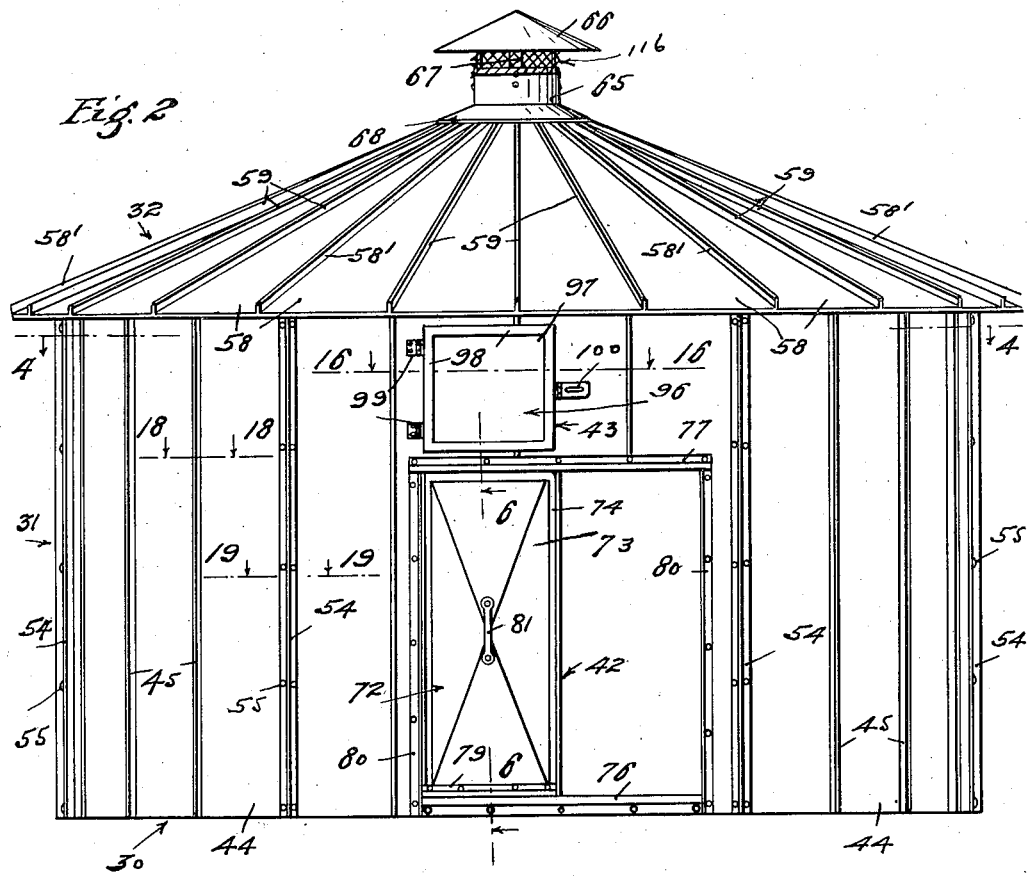
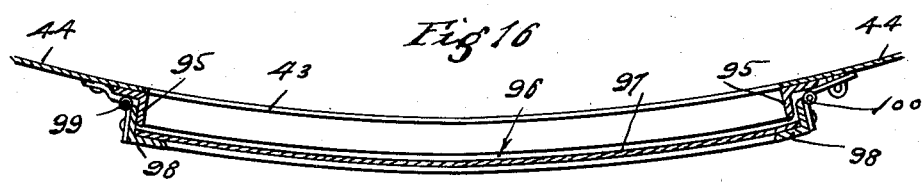
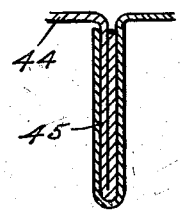
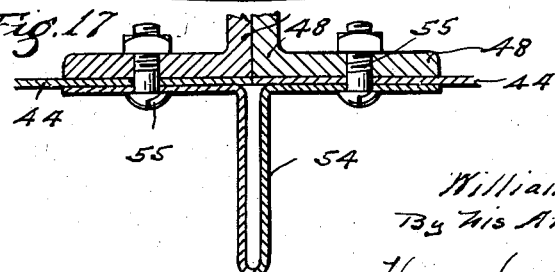

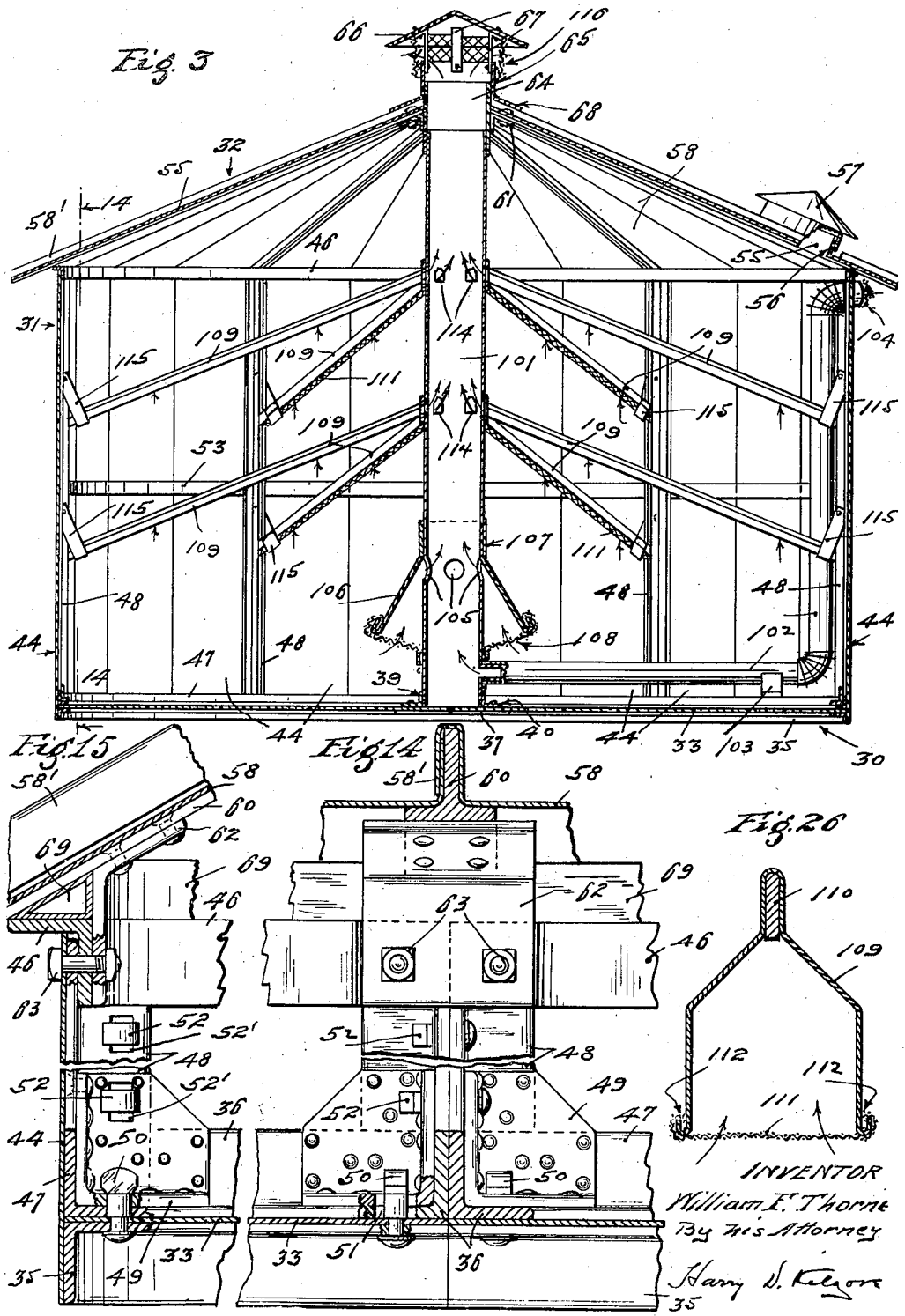

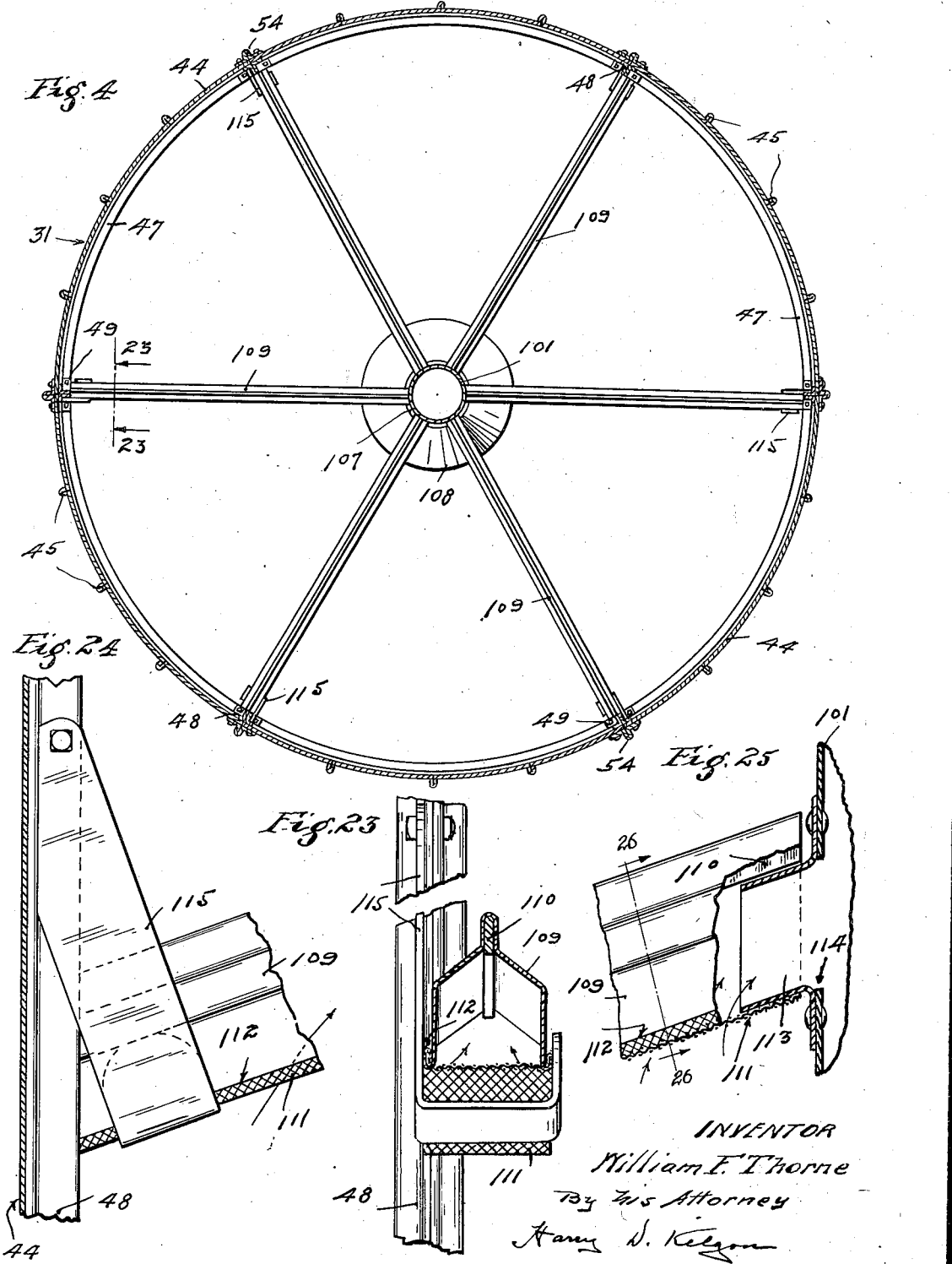

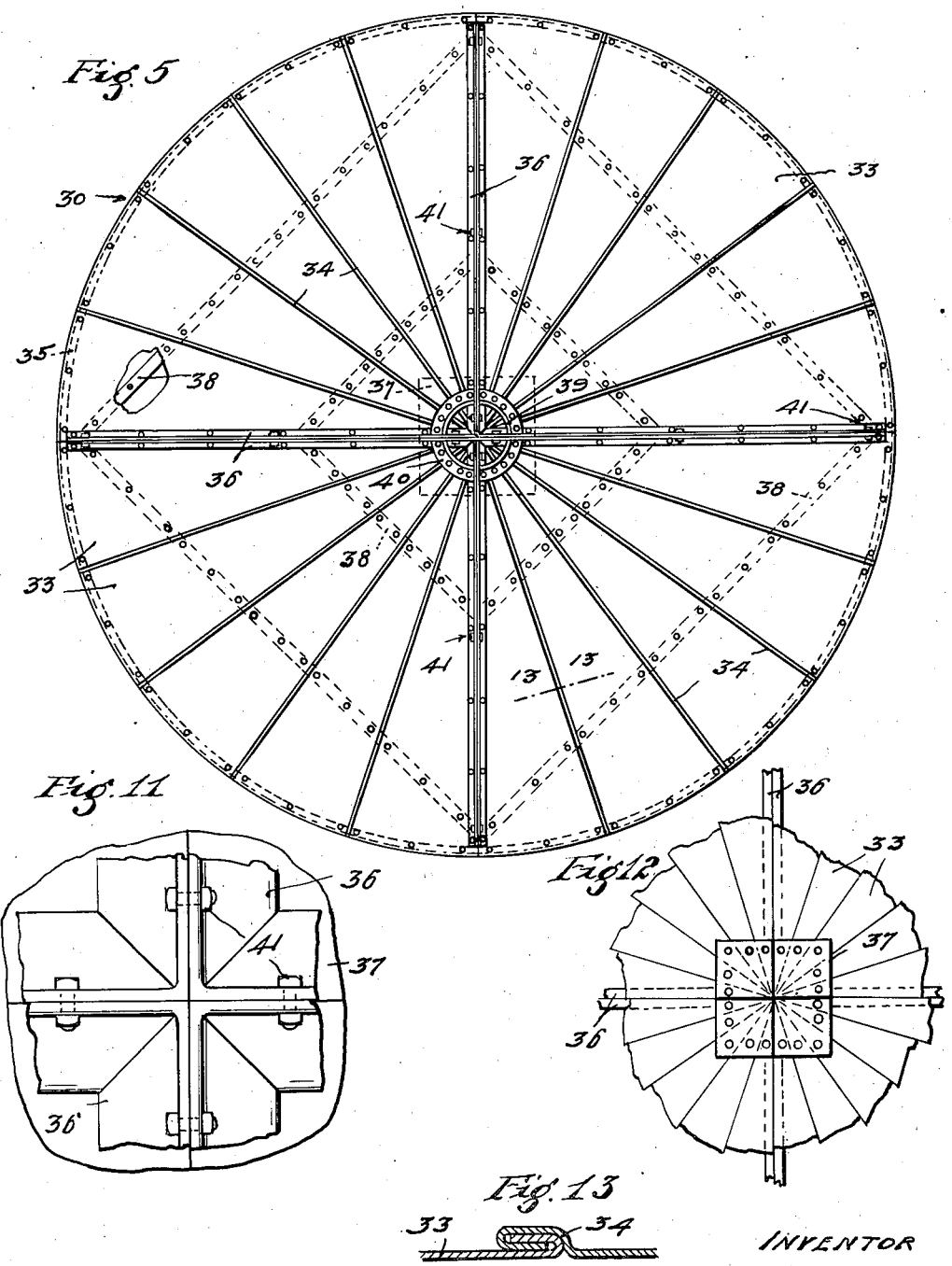

Sept. 5, 1944. W. F. THORNE 2,357,705
PORTABLE GRAIN STORAGE TANK
Filed Feb. 17, 1941 6 Sheets-Sheet 6
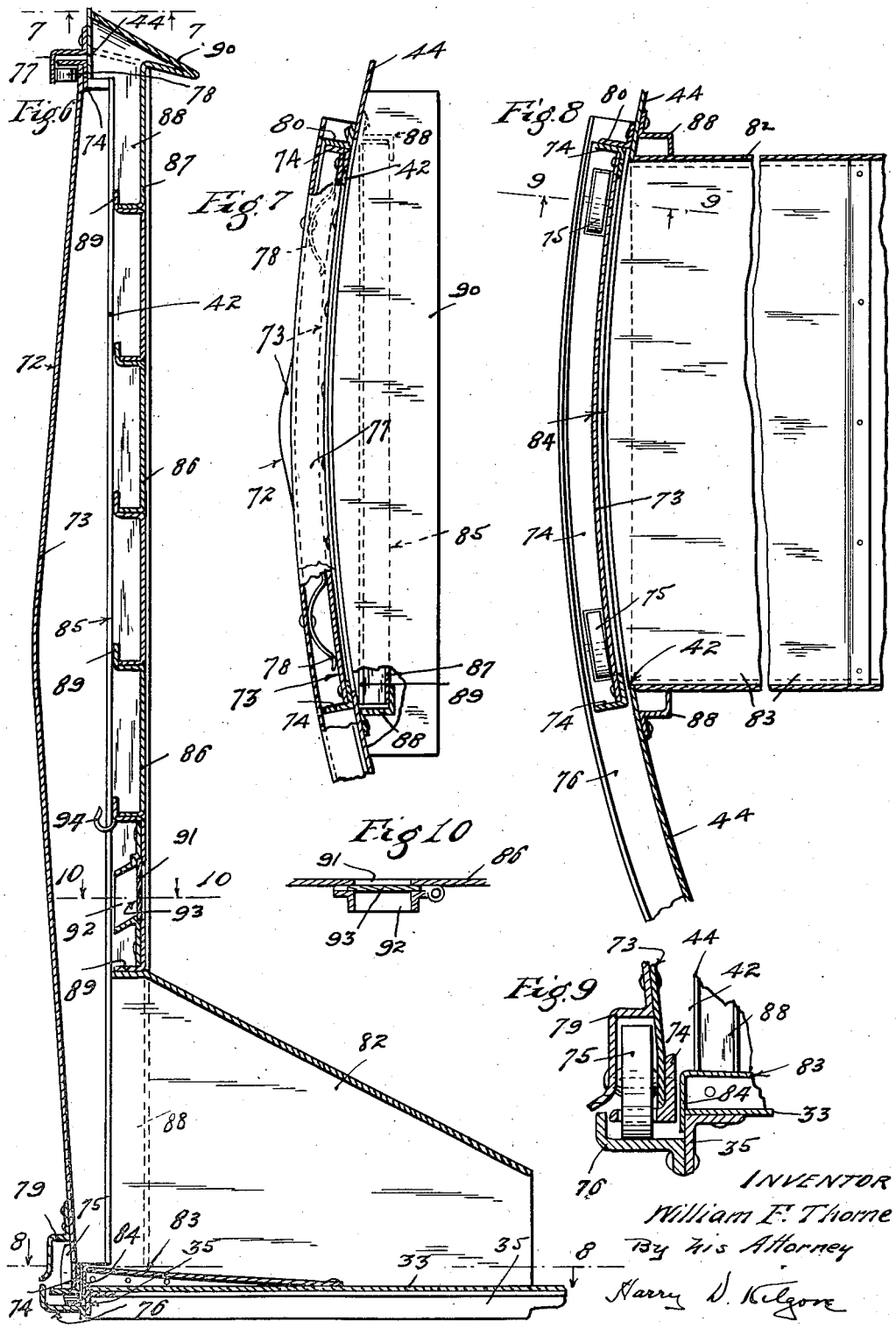

Patented Sept. 5, 1944

2,357,705

UNITED STATES PATENT OFFICE 2,357,705

PORTABLE GRAIN STORAGE TANK

William F. Thorne, Minneapolis, Minn.

Application February 17, 1941, Serial No. 379,191

3 Claims. (Cl. 98—55)

My present invention relates to improvements in grain storage tanks.

It is an object of this invention to provide a grain storage tank that is portable and made up of sections which are easy to handle and completely fabricated in the shop and marked with identifying characters so that a person to whom the grain tank is shipped can quickly and easily assemble and erect the same.

A further object of the invention is to provide a grain tank having means, including a stack, for drawing cool fresh air into the tank and then discharging the same to carry off excess heat and moisture in the tank and grain so that the grain will not burn or mold and hence will not deteriorate in grade.

Other objects of the invention will be apparent from the following specification had in connection with the drawings.

To the above end, generally stated, the invention consists of the novel devices and combination of devices hereinafter described and defined in the claims.

In the accompanying drawings, which illustrate the invention, like characters indicate like parts throughout the several views.

Referring to the drawings:

Fig. 1 is a plan view of the improved grain storage tank;

Fig. 2 is a front elevation of the same;

Fig. 3 is a view partly in elevation and partly in vertical section, taken on the line 3—3 of Fig. 1;

Fig. 4 is a view partly in plan and partly in horizontal section taken substantially on the line 4—4 of Fig. 2;

Fig. 5 is a plan view of the floor of the grain tank with the outside shell removed;

Fig. 6 is a fragmentary view in vertical section, taken substantially on the line 6—6 of Fig. 2, on an enlarged scale;

Figs. 7 and 8 are fragmentary detail views partly in plan and partly in horizontal section taken substantially on the line 7—7 and 8—8, respectively, of Fig. 6;

Fig. 9 is a fragmentary detail view partly in elevation and partly in vertical section taken on the line 9—9 of Fig. 8;

Fig. 10 is a fragmentary detail view in horizontal section taken on the line 10—10 of Fig. 6;

Fig. 11 is a fragmentary detail plan view of the central portion of the floor of the grain tank, on an enlarged scale;

Fig. 12 is a fragmentary bottom plan view of the central portion of the floor of the grain tank, as shown in Fig. 5;

Fig. 13 is a fragmentary detail view in section taken on the line 13—13 of Fig. 5, on an enlarged scale;

Fig. 14 is a fragmentary detail view partly in elevation and partly in vertical section taken substantially on the line 14—14 of Fig. 3, on an enlarged scale;

Fig. 15 is a view partly in elevation and partly in vertical section taken substantially on the line 15—15 of Fig. 14;

Fig. 16 is a fragmentary view in horizontal section taken on the line 16—16 of Fig. 2, on an enlarged scale;

Fig. 17 is a fragmentary detail view principally in section taken on the line 17—17 of Fig. 2, on an enlarged scale;

Fig. 18 is a fragmentary detail view in section, taken on the line 18—18 of Fig. 2, on an enlarged scale;

Fig. 19 is a fragmentary plan view of the roof of the grain bin and also showing by broken lines the underlying lock bar and co-operating clips on an enlarged scale;

Figs. 20 and 21 are fragmentary detail views partly in elevation and partly in section taken on the lines 20—20 and 21—21, respectively, of Fig. 19;

Fig. 22 is a fragmentary detail view in section taken on the line 22—22 of Fig. 1, on an enlarged scale;

Fig. 23 is a fragmentary detail view partly in elevation and partly in section taken on the line 23—23 of Fig. 4, on an enlarged scale;

Fig. 24 is a right-hand side elevation of the parts shown in Fig. 23;

Fig. 25 is a fragmentary detail view partly in side elevation and partly in section taken on the line 25—25 of Fig. 4, on an enlarged scale; and Fig. 26 is a detail view in transverse section taken on the line 26—26 of Fig. 25.

The improved grain storage tank comprises a floor structure 30, an external wall structure 31 and a roof structure 32, and each of said structures is separate and independent the one from the other. Each of the above structures is made up of galvanized sheet metal and commercial angle and T-bars. The improved grain tank is round in cross-section and the roof structure 32 is conical.

The floor structure 30 (see Figs. 5, 11, 12, 13 and 15), as shown, comprises four separate and independent sections identical the one with the other and each thereof being in the form of a quadrant. Each section of the floor structure 30, as shown, is made up of five sheet metal members 33 and the joints therebetween are in lines that radiate from the center of the grain tank. The members 33 of each floor section are rigidly connected at their joints by interlocked seams 34. See Fig. 13.

The floor structure 30 is reinforced at its outer marginal edge portion by an annular underlying segmental angle bar 35. The vertical flange of the angle bar 35 extends downward and the horizontal flange thereof extends inwardly under the floor structure 30 and the members 33 are rigidly secured thereto by rivets. Each section of the floor structure 30 is further reinforced, at its longitudinal edge portions, by a single angle bar 36 bent upon itself at the center of the grain tank, see Fig. 11, with its horizontal flange turned inwardly in respect to the respective floor section, resting on the respective members 33 and rigidly secured thereto by rivets.

To further reinforce the sections of the floor structure 30 a flat plate 37, comprising four members one for each section of the floor structure 30, underlies said structure at the center thereof and is rigidly secured by rivets to the members 33 and the angle bars 36. The members 33 of each section of the floor structure 30 are still further reinforced by a pair of underlying edgewise spaced bars 38 which extend transversely of the members 33, are rigidly secured at their ends to the angle bars 36 and said members 33 are rigidly secured thereto by rivets.

Concentric with the center of the floor structure 30 is an upstanding segmental stack-retaining collar 39, for a purpose that will presently appear. On the lower end of the collar 39 is a flange 40 riveted to the sections of the floor structure 30 and securing one section of said collar to each floor section.

The four complete sections of the floor structure 30 are detachably connected, the one to the other, by nut-equipped bolts 41 which extend through aligned bores in the vertical flanges of abutting pairs of angle bars 36.

The wall structure 31, as shown, comprises six separate and independent sections that are identical the one with the other, except that one of said sections has a lower or main door opening 42 and an upper or auxiliary door opening 43. Each section of the wall structure 31 comprises four upright sheet metal members 44. The members 44 which go to complete the external wall structure 31 are telescoped over the floor structure 30 at the perimeter thereof and the annular vertical flange of the angle bar 35. See Fig. 15. The wall members 44 of each section, at the vertical joints therebetween, are rigidly connected by outstanding folded seams 45. See Fig. 18. Annular upper and lower segmental reinforcing angle bars 46 and 47, respectively, are permanently secured to the members 44 of the section of the wall structure 31. See Figs. 14 and 15. An upright reinforcing angle bar 48 is rigidly secured to each longitudinal edge portion of each wall section on the inside thereof. The vertical flange of the upper angle bar 46 is turned downwardly onto the inside face of the wall structure 31 and the horizontal flange thereof is turned outwardly over the top of said structure. By reference to Fig. 15, it will be noted that the end of the horizontal flange of the angle bar 46 is outwardly offset and overlaps the flange of the upright angle bar 48 which bears against the wall structure 31.

The horizontal flange of the lower angle bar 47 is turned inwardly, rests on the floor structure 30 and supports the wall structure therefrom. The vertical flange of the angle bar 47 is turned upwardly and the wall members 44 are rigidly secured thereto.

Corner brackets 49 rigidly connect the upright angle bars 48, at their lower ends, to the angle bar 47 and also rigidly connect certain of the angle bars 36, at their outer ends, to the respective upright angle bars 48 and the angle bar 47. Obviously, the members 44 of each section of the wall structure 31 are secured at their outer edge portions to a rigid marginal frame comprising sections of the angle bars 46 and 47 and a pair of upright angle bars 48.

The several sections of the wall structure 31 are detachably secured to the floor structure 30 by lock studs 50 anchored and turnably mounted in said floor structure and extended through slots 51 in said wall structure 31. See Figs. 14 and 15.

Lock studs 52 and co-operating slots 52' similar to the lock studs 50 and slots 51, detachably connect the sections of the wall structure 31 at adjacent pairs of uprights 48. As annular segmental bar 53 to which the wall members 44 are secured at their inner faces and intermediate of their ends, further reinforce the wall structure 31. The vertical joints between the several wall sections are externally covered by T-shaped members 54, formed by folding strips of sheet metal and secured to said wall sections by nut-equipped bolts 54'. These members 54 have the same general appearance as the folded seams 45.

The roof structure 32, as shown, comprise six sections that are identical the one with the other, except one thereof has a filling opening 55 surrounded by an upstanding annular flange 56. This filling opening 55 is normally closed by a conical cap 57 telescoped onto the flange 56.

Each section of the roof structure 32 comprises six sections each of which is made up of four sheet metal members 58. The joints between the members 58 are on lines that radiate from the center of the grain tank. The several members 58 of each section of the roof structure 32 are connected by upstanding folded seams 59. See Fig. 22. The several sections of the roof structure 32, at the joints therebetween, are supported on radially extended rafters 60 in the form of T-bars, the intermediate flanges of which extend upwardly. See Fig. 14. The marginal edge portions of the roof members 58 at the rafters 60 are folded over the upright flanges of said rafters and folded upon themselves to afford weather-tight joints 58' between the several roof sections.

The roof structure 32, including the members 58 and the rafters 60 are supported on and bolted to the outturned flange on an annular collar 61. The rafters 60, at their outer end portions, rest on the angle bar 46 and are detachably secured thereto by angle brackets 62. These brackets 62 are riveted to the rafters 60 and are detachably secured to the angle bar 46 and certain of the angle bars 48 by nut-equipped bolts 63. See Fig. 15. The roof structure 32 extends materially outwardly of the wall structure 31 to afford overhanging eaves.

A sleeve 64 is telescoped through an aperture in the roof structure 32 at the center thereof and the collar 61 and is rigidly secured to said collar. Telescoped onto the sleeve 64 outwardly of the roof structure 32 is a short pipe section 65, covered by a conical cap 66. This cap 66 extends materially outwardly of the pipe section 65 and is secured thereto by brackets 67 and held by said brackets spaced above said pipe section to leave a draft opening therebetween.

On the lower end of the pipe section 65 is an outwardly projecting flange or flashing 68 that rests on the roof structure 32 and forms a weather-tight joint between said structure and the sleeve 64.

A segmental annular fillet 69 closes the opening between the wall structure 31 and the roof structure 32 and forms a weather-tight joint therebetween.

It may be here stated that the folded seams 45 and the members 54 form weather-tight joints in the wall structure 31 and the folded seams 59 afford weather-tight joints between the connected roof members 58.

Lock bars 70 and co-operating pairs of clips 71 detachably secure the roof structure 32 to the rafters 60. The lock bars 70 are intermediately pivoted to the rafters 60 and the clips 71 of each pair are reversely arranged and secured to the roof sections by rivets, see Figs. 19, 20 and 21.

The main door opening 42 is normally closed by a sliding door 72 which comprises a sheet metal panel 73 reinforced at its marginal edge portions by angle bars 74. A pair of wheels 75 is journaled on the door 72 at its bottom and arranged to run in a track 76 formed by a Z-bar secured to the angle bar 35 below the door opening 42. The upper end portion of the door 72 works in a guide 77 formed by a Z-bar secured to the wall structure 31 above the door opening 42. Leaf springs 78, secured at their intermediate portions to the guide 77, yieldingly engage the door 72 and press the same against the wall structure 31 and form a tight joint therebetween. See Figs. 6 and 7. A guard 79 in the form of a Z-bar is secured to the door 72 above its wheels 75 and extends above and outwardly of said wheels and covers the track 76.

Upright angle bar stops 80 limit the opening and closing movements of the door 72. A handle 81 is secured to the door 72 at the center thereof for use in opening and closing the same. The door 72 will be provided with a suitable lock, not shown. To strengthen the door 72, its panel 73 is upset and outwardly bulged.

In the lower end portion of the door opening 42 is a shovelling bin 82 open at both ends. Within the front end portion of the shovelling bin 82 is a false bottom 83 that is downwardly and rearwardly inclined from the front end of said bin. The front end portion of the false bottom 83 is turned downwardly to afford a flange 84 that overlaps the floor structure 30, at the door opening 43, and assists in holding the shovelling bin 82 in place.

The door opening 42, between the shovelling bin 82 and the top of said door opening, is normally closed by an inner door 85 comprising lower and intermediate sections 86 and a top section 87. This inner door 85 is supported on the top of the shovelling bin 82 and is removably held by a pair of vertical guides 88 secured to the wall structure 31 on the inside thereof at the sides of the door opening. Each door section 86 is in the form of a horizontally disposed channel, the side flanges of which extend outwardly. Formed with the upper flange of each door section 86 is an upstanding flange 89 with which the lower flange of the supported section engages and holds said supported section against outward relative movement. The upper door section 87 is like the door sections 86, except its upper portion which is folded to form a cover 90 for the inner door 85. This cover 90 closely engages the inner surface of the wall structure 31, above the door opening 42, and extends downwardly and inwardly materially beyond the inner face of the inner door 85. The purpose of the cover 90 is to make the opening over the inner door 85 grain-tight and to direct grain lodging on the cover into the grain tank.

Formed in the lower door section 86 is a grain-discharge opening 91 and leading therefrom is a short discharge spout 92 that extends outwardly and downwardly from said door section. A sliding gate 93 mounted between the discharge opening 91 and the spout 92 normally closes said opening. For holding a bag, not shown, to receive grain as the same is discharged from the spout 92, there is secured to the upper flange of the lower gate section 86 a pair of bag-engaging hooks 94, only one of which is shown.

The upper door opening 43 is provided, on the outside of the wall structure 31, with a frame 95 formed from an angle bar. This door opening 43 is normally closed by an upper or auxiliary door 96 comprising a sheet metal panel 97 secured to a reinforcing marginal frame 98 formed from an angle bar. The inturned flange of the frame 98 caps the outturned flange of the door frame 95 and forms a tight joint therebetween. Hinges 99 connect the door 96 to the door frame 95 and the wall structure 31 and a hasp 100 provided for co-operation with a padlock (not shown) is provided for holding the door 96 closed.

A stack 101 in the form of a round tube extends centrally and upwardly through the grain tank. This stack 101 is loosely supported on the floor structure 30 within the collar 39 and its upper end portion is loosely telescoped into the sleeve 64 at its lower end portion.

A fresh air intake pipe 102 leads from the exterior of the grain tank at the top of the wall structure 31 to the stack 101 at the lower end thereof. This pipe 102 includes a vertical section that closely follows the interior of the wall structure and a horizontal section that is closely positioned to the floor structure 30. The horizontal section of the fresh air intake pipe 102, at its outer end portion, is supported on a block 103. A screen 104 covers the outer or intake end of the fresh air intake pipe 102.

A plurality of circumferentially spaced air intake ports 105 are formed in the stack 101 above the fresh air intake pipe 101. To prevent grain from entering the stack 101 through the ports 105, they are surrounded by an outwardly and downwardly flaring skirt 106. This skirt 106 has on its upper end a collar 107 that fits around the stack 101 just above the ports 105, is rigidly secured to said stack and holds said skirt suspended therefrom. The space between the stack 101 and the lower or bottom edge of the skirt is closed by a screen 108.

Upper and lower series of air-conducting tubes 109 extend radially or laterally from the stack 101 to the wall structure 31. Each tube 109, at its top, is folded over the upper edges onto the flat sides of a reinforcing bar 110 and then extends downwardly and outwardly therefrom. The sides of the tube 109 are parallel and the bottom of said tube is open and covered by a screen 111. The lower longitudinal edge portions of the sides of the tube 109 are folded outwardly upon themselves to form grooves 112 and the screen 111 is attached to the tube 109 by securing its longitudinal edge portions in said grooves.

The tubes 109 at their inner ends are detachably supported from the stack 101 by having their said ends telescoped onto short tube sections 113 secured to the stack 101. Ports 114 in the stack 101 afford communicating passageways from the tubes 109 to the interior of the stack 101. The tubes 109, at their outer ends, are detachably supported by hanger arms 115 pivoted to the upright angle bars 48.

As shown, there are six tubes 109 in each series and they engage, at their outer ends, the inturned flanges of the angle bars 48 and are thereby held against endwise movement away from the short tube sections 113. The tubes 109 are upwardly and inwardly inclined from the wall structure 31 to the stack 101 and thereby extend obliquely through grain in the grain tank. The size of the mesh of the screens 108 and 111 is such as to prevent grain from entering the skirt 106 and the tubes 109. The space between the pipe section 65 and the cap 66 is closed by a screen 116. The purpose of the screens 104 and 116 is to prevent birds, squirrels, and vermin from entering the grain tank.

Upward movement of air in the stack 101 produces a draft that draws a supply of cool air from the exterior of the grain tank through the pipe 102. Hot air and steam from the grain will be drawn by the draft in the stack 101 under the skirt 106 where the same will enter the stack 101 through the ports 105. Natural drafts due to the inclination of the tubes 109, supplemented by the draft in the stack 101, will draw hot air and steam from the grain into the tubes 109 through the screened open bottoms thereof. Hot air and steam moving upwardly in the tubes 109 upon entering the stack 101 will commingle with the hot air and steam moving upwardly in the stack 101 and be discharged from said stack under the cap 66 and outside of the grain tank.

Obviously, the series of lateral tubes 109 due to their inclination and the ports 105 tap the body of grain in the improved tank at a multiplicity of levels and thereby keep the grain at an even temperature, and thus prevent burning or molding. In case the grain starts to heat, the force of the draft in the stack 101 will be proportionately increased and hence an increase of cool air will be drawn into the stack 101 through the pipe 102 and thereby prevent further heating of the grain.

From the above description, it is evident that the sections of improved grain tank can be quickly and easily assembled and connected by a person not having previous experience and with use of a wrench and possibly a hammer.

The drawings illustrate a commercial form of the invention, but it will be understood that the same is capable of certain modifications as to details of construction, arrangement and combination of parts within the scope of the invention herein disclosed.

What I claim is:

1. The combination with a grain storage tank, of a ventilating system for the tank including a central imperforate stack, a fresh air intake pipe leading from the top of the tank at the exterior thereof and having communication at its outlet end with the stack at its lower end, an air intake port in the stack above the outlet end of the air intake pipe, a downwardly flaring skirt surrounding the stack and covering said port, said skirt at its upper end closely engaging the stack, a screen covering the open bottom of the skirt, upper and lower series of air intake tubes having open bottoms, the tubes of each series being circumferentially spaced about the stack and extending radially therefrom, said tubes being upwardly inclined toward the stack and having communication therewith at their outlet ends and screens covering the open bottoms of the tubes.

2. In a ventilating system of the kind described, a horizontally disposed air intake tube having an imperforate top and substantially parallel imperforate side members and also having a perforated bottom member, and a reinforcing bar extending longitudinally through the tube for suspending the same, said top member at its transverse center being folded upon itself to form an inverted channel in which said bar is mounted, said top member from each side member being upwardly inclined to said channel.

3. The combination with a grain storage tank, of a ventilating system for the tank including a central imperforate stack, a fresh air intake pipe leading from the top of the tank at the exterior thereof and having communication at its outlet end with the stack at its lower end, an air intake port in the stack above the outlet end of the air intake pipe, a downwardly flaring skirt surrounding the stack and covering said port, said skirt at its upper end closely engaging the stack, a screen covering the open bottom of the skirt, a series of air intake tubes having open bottoms, said tubes being circumferentially spaced about the stack and extending radially therefrom, said tubes being upwardly inclined toward the stack and having communication therewith at their outlet ends and screens covering the open bottoms of the tubes.

WILLIAM F. THORNE.